United States Patent
Nakagome et al.

[11] 3,761,482
[45] Sept. 25, 1973

[54] PROCESS AND INTERMEDIATES FOR THE PREPARATION OF N-SUBSTITUTED 6,7-METHYLENEDIOXY-4-QUINOLONE DERIVATIVES

[75] Inventors: Takenari Nakagome; Hideo Agui, both of Osaka; Toru Mitani; Mitsuo Nakashita, both of Hyogo, all of Japan

[73] Assignee: Sumitomo Chemical Co., Ltd., Osaka, Japan

[22] Filed: July 9, 1970

[21] Appl. No.: 53,706

[30] Foreign Application Priority Data
July 10, 1969 Japan.............................. 44/54890
Oct. 2, 1969 Japan.............................. 44/79408
Oct. 2, 1969 Japan.............................. 44/79409
Oct. 2, 1969 Japan.............................. 44/79410
Nov. 12, 1969 Japan.............................. 44/90957
July 9, 1969 Japan.............................. 44/54661
Feb. 23, 1970 Japan.............................. 45/15722

[52] U.S. Cl..... 260/287 R, 260/283 SY, 260/286 Q, 260/340.5
[51] Int. Cl.............................................. C07d 33/48
[58] Field of Search................................. 260/287

[56] References Cited
OTHER PUBLICATIONS
Gramstad – J. Chem. Soc., 1957, Pt. 3 pp. 4069–4079.

*Primary Examiner*—Donald G. Daus
*Attorney*—Sughrue, Rothwell, Mion, Zinn and Macpeak

[57] ABSTRACT

Novel process for producing antimicrobial 1-substituted-6,7-methylenedioxy-4-quinolone-3-carboxylic acid derivatives of the formula,

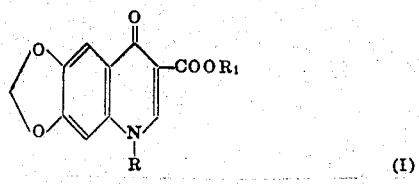

(I)

wherein R is alkyl or alkenyl, and $R_1$ is hydrogen or alkyl. The novel process is shown by the following reaction schema:

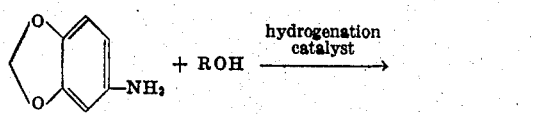

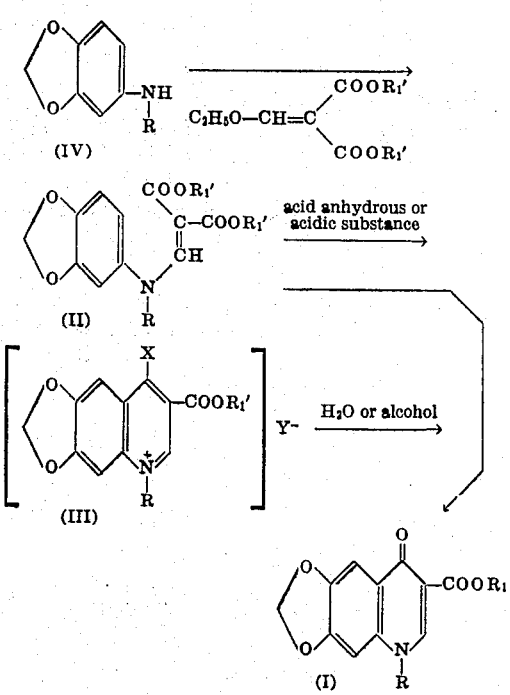

wherein R and $R_1$ are as defined above; $R_1'$ is alkyl; X is halogen; and Y is, for example, halogen. The 1-substituted-6,7-methylenedioxy-4-quinolone-3-carboxylic acid derivative of the formula (I) can be also produced directly from the compound of the formula (II) by the reaction with the acid anhydrous or acidic substance.

The quinolinium salt of the formula (III) can be, alternatively produced by the process as shown below:

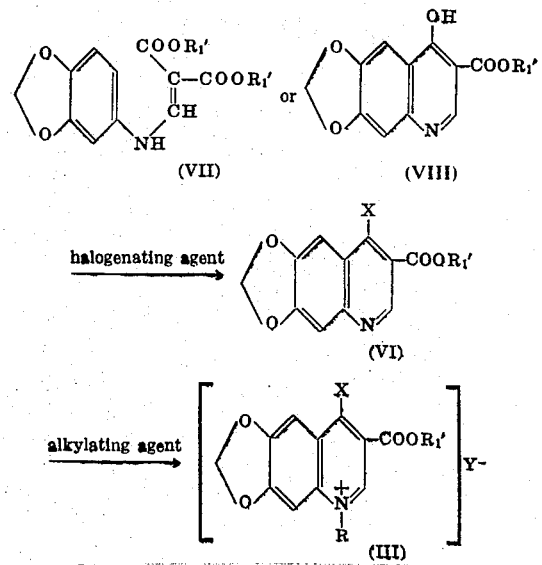

wherein R, $R_1'$, X and Y is as defined above.

1 Claim, No Drawings

PROCESS AND INTERMEDIATES FOR THE PREPARATION OF N-SUBSTITUTED 6,7-METHYLENEDIOXY-4-QUINOLONE DERIVATIVES

BACKGROUND OF THE INVENTION

1. Field of the Invention

The present invention relates to the production of 1-substituted-6,7-methylenedioxy-4-quinolone derivatives which have prominent antibacterial activity and to novel compounds useful as intermediates for the production thereof. More particularly, the invention pertains to a novel method for the production of 1-substituted-6,7-methylenedioxy-4-quinolone-3-carboxylic acid derivatives of the formula,

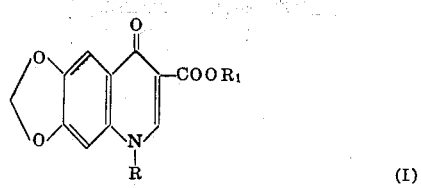

wherein R is alkyl or alkenyl and $R_1$ is hydrogen or alkyl, and to novel compounds useful as intermediates for their production.

The term "alkyl" as used throughout this specification means straight or branched chain alkyl radicals having from one to twenty carbon atoms. The term "alkenyl" refers to alkenyl radicals having from two or four carbon atoms.

Preferred examples of R and $R_1$ are alkyl radicals of not more than 4 carbon atoms, for example, methyl, ethyl, n-propyl, n-butyl, isopropyl, isobutyl or secondary butyl radicals, in terms of both the antibacterial activity of the product and the readiness with which the reaction proceeds.

2. Description of the Prior Art

It has been known that the 1-substituted-6,7-methylenedioxy-4-quinolone-3-carboxylic acids are useful as antimicrobials (see, for example, Japanese Pat. Publication 18141/1968).

Hitherto these 1-substituted-6,7-methylenedioxy-4-quinolone-3-carboxylic acids have been produced by the process shown by the following reaction schema:

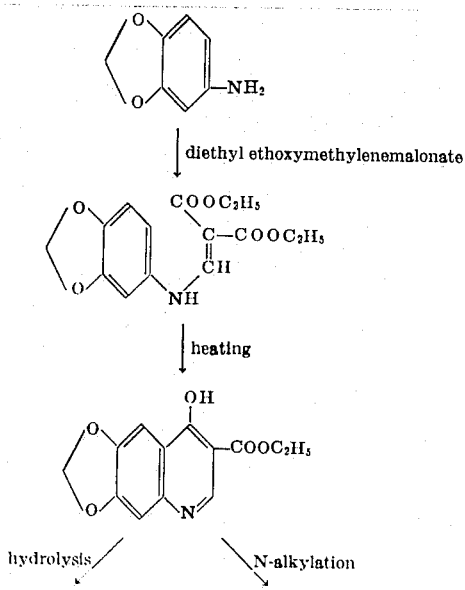

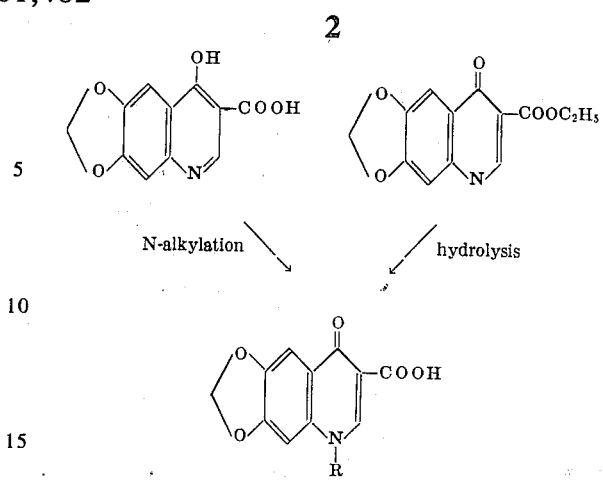

1-substituted-6,7-methylenedioxy-4-quinolone-3-carboxylic acid.

This prior art process includes N-alkylation of either 3-ethoxycarbonyl-6,7-methylenedioxy-4-hydroxyquinoline or 6,7-methylenedioxy-4-hydroxy-3-quinoline-carboxylic acid. It has been found, however, that such N-alkylation is disadvantageous in that the reaction necessitates the use of sodium hydride, which is very troublesome to handle and further requires the use of a large amount of alkylbromide or alkyliodide, both of which are very expensive. In addition, the yield obtained in the cyclization of diethyl 3,4-methylenedioxy-anilinomethylenemalonate to ethyl 4-hydroxy-6,7-methylene-dioxy-3-quinolinecarboxylate is poor.

SUMMARY OF THE INVENTION

Applicants, on the other hand, have developed a novel and advantageous method for the production of 1-substituted-6,7-methylenedioxy-4-quinolone-3-carboxylic acid derivatives. According to the present invention, 1-substituted-6,7-methylene-dioxy-4-quinolone-3-carboxylic acid derivatives of formula (I) can be produced very economically and advantageously by reacting 3,4-methylenedioxyaniline with an alcohol in the presence of a conventional hydrogenation catalyst, preferably a Raney nickel catalyst, to yield an N-substituted-3,4-methylenedioxyaniline, condensing the obtained N-substituted-3,4-methylenedioxyaniline with a dialkyl ethoxymethylenemalonate to yield a dialkyl N-substituted-3,4-methylenedioxyanilinomethylenemalonate, and cyclizing the obtained dialkyl N-substituted-3,4-methylenedioxyanilinomethyl-lenemalonate in the presence of a condensing agent selected from the group consisting of an acid anhydride, an acidic substance and a mixture thereof to yield a 1-substituted-6,7-methylenedioxy-4-quinolone-3-carboxylic acid or its ester, either directly or through an intermediate N-substituted 3-alkoxycarbonyl-6,7-methylenedioxy-quinolinium salt. All of the above reactions proceed in high yield and require a reagent which is neither expensive nor troublesome to handle.

Applicants have further discovered that the 1-substituted-3-alkoxy-carbonyl-4-halogeno-6,7-methylenedioxyquinolinium salt can be alternatively produced by reacting a dialkyl 3,4-methylenedioxyanilinomethylenemalonate or a 3-alkoxycarbonyl-4-hydroxy-6,7-methylenedioxyquinoline with a halogenating agent to yield a 3-alkoxycarbonyl-4-halogeno- 6,7-methylene-dioxyquinoline and reacting the obtained 3-alkoxycarbonyl-4-halogeno-6,7-methylenedioxyquinoline with an alkylating or alkenylating agent. In contrast with the known cyclization reaction of diethyl 3,4-methylenedioxyanilinomethylenemalonate where the yield is poor, the novel method of the present invention, using a halogenating agent, furnishes a high yield of cyclized product under much milder reaction conditions. The reaction of 3-alkoxy-carbonyl-4-halogeno-6,7-methylenedioxyquinoline with an alkylating or alkenylating agent results in an almost quantitative yield of the product.

DETAILED DESCRIPTION OF THE INVENTION

The method of the present invention is briefly shown by the following reaction schema, wherein R and $R_1$ are as defined above, $R_1'$ is alkyl as defined for $R_1$, and Y is an organic or inorganic acid anion.

duction of 1-substituted 6,7-methylene-dioxy-4-quinolone-3-carboxylic acid derivatives of the formula (I). Another object of the present invention is to provide novel compounds which are useful for the production of the 1-substituted 6,7-methylenedioxy-4-quinolone-3-carboxylic acid derivatives of the formula (I). Other objects and merits of the present invention will be apparent from the following descriptions.

In order to accomplish these objects, the present invention provides a method for the production of the formula,

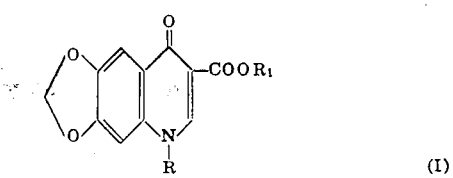

wherein R is $C_1$-$C_{20}$ alkyl or $C_2$-$C_4$ alkenyl and $R_1$ is hy-

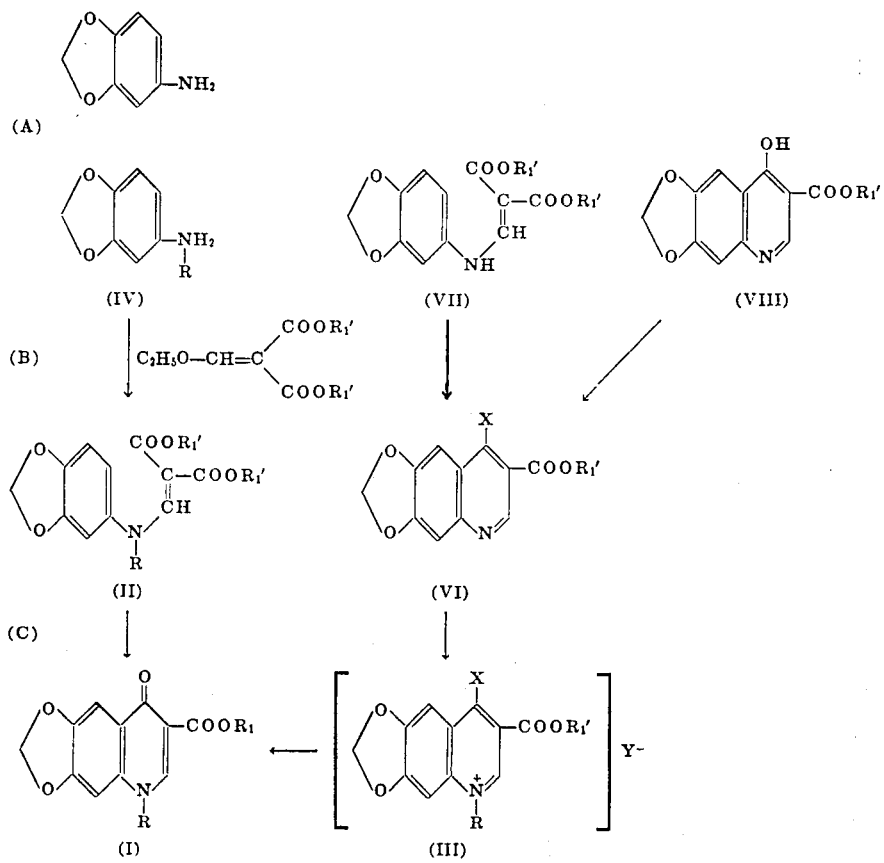

The aforesaid organic or inorganic anion may be exemplified by chloride, bromide, iodide, sulfate, phosphate, nitrate, perchlorate, borofluoride, formate, acetate, propionate, oxalate, succinate, alkylsulfate, alkylsulfonate, arylsulfonate or the like. However, these examples are not limitative but only illustrative.

Among the compounds produced by our method, N-$C_{2-20}$-alkyl- or N-alkenyl-3,4-methylenedioxyanilines of the formula (IV), N-alkyl- or N-alkenyl-3,4-methylenedioxyanilinomethylenemalonates of the formula (II), 3-alkoxycarbonyl-4-halogeno-6,7-methylenedioxyquinolines of the formula (VI) and their N-alkylated or N-alkenylated quaternary ammonium salts of the formula (III) are novel compounds.

Accordingly, an object of the present invention is to provide a novel and advantageous method for the prodrogen or $C_1$-$C_{20}$ alkyl.

Further detailed descriptions concerning the reaction steps of the method of the present invention are given below.

Reaction A-Preparation of N-substituted 3,4-methylenedioxyanilines

In the reaction of the present invention, 3,4-methylenedioxyaniline is contacted with an equivalent or larger amount of an alcohol of the formula, ROH, wherein R is as defined above, at a temperature of 0°–200°C, preferably 50°–150°C, in the presence of a conventional hydrogenation catalyst, preferably a Raney nickel catalyst. Use of an excess of the alcohol does not prevent the progress of the reaction. The amount of the catalyst is not limited. It is preferred to use 1/100 or more part of the catalyst, based on the weight of the 3,4-methylenedioxyaniline. The reaction may be carried out in the presence of an inert solvent such as benzene, toluene, xylene, an ether, hexane, petroleum ether, ligroin, an alcohol, and water. It is especially preferred to use as the solvent the same alcohol used as the alkylating or alkenylating agent. It is also preferred to carry out the reaction under an atmosphere of inert gas, because when 3,4-methylenedioxyaniline and the prepared N-alkyl-3,4-methylenedioxyaniline are contacted with air, they are considerably colored.

3,4-Methylenedioxyaniline used as the starting substance is known compound and produced, for example, by reducing 3,4-methylenedioxynitrobenzene. So, in case this reduction is carried out by catalytic hydrogenation in the presence of an alcohol, it is possible to conduct the alkylation or alkenylation of the present invention consecutively following the reduction by heating of the reaction mixture at a suitable temperature.

The N-substituted-3,4-methylenedioxyaniline thus obtained is a colorless and fluid liquid and soluble in organic solvents, such as alcohols, benzene, chloroform and ethers.

The N-substituted-3,4-methylenedioxyanilines obtained by the present invention are novel compounds except for N-methyl-3,4-methylenedioxyaniline. N-Methyl-3,4-methylenedioxyaniline has been produced previously by heating 6-methylaminopiperonylic acid in the presence of copper powder or acylating 3,4-methylenedioxyaniline, treating the obtained 3,4-methylenedioxyacetanilide with methyliodide and alkali and then hydrolyzing the resultant N-methy-3,4-methylenedioxyacetanilide. These known processes, however, necessitate the use of very expensive materials and complicated operations, and are therefore not industrially advantageous. In contrast to the above procedure, the method of the present invention is very advantageous in that it is possible to produce the desired N-substituted-3,4-methylenedioxyaniline from 3,4-methylenedioxyaniline in high yield in a single step.

Reaction B-Preparation of dialkyl N-substituted-3,4-methylenedioxyanilino-methylenemalonates of the formula (II)

Dialkyl N-substituted-3,4-methylenedioxyanilinomethylenemalonates of the formula (II) can be produced by a conventional method, that is, by reacting an N-substituted-3,4-methylenedioxyaniline with an equimolar amount of a dialkyl ethoxymethylenemalonate at a temperature of 50°–200°C. The reaction is carried out, if necessary, in the presence of an inert solvent, such as toluene, benzene, diphenyl, diphenyl ether, mineral oil, etc. The yield is almost quantitative.

Reaction C-Preparation of N-substituted-6,7-methylenedioxy-4-quinolone-3-carboxylic acid derivatives of the formula (I)

A dialkyl N-substituted-3,4-methylenedioxyanilinomethylenemalonate of the formula (II) is contacted with an acidic compound or an acid anhydride selected from the group consisting of phosphorus pentoxide, acetic anhydride propionic anhydride, sulfuric acid, polyphosphoric acid, polyphosphoric acid ester, phosphorus oxyhalide such as phosphorus oxychloride and phosphorus oxybromide, phosphorus trichloride, phosphorus tribromide, phosphorus pentachloride, thionylchloride, a fluorinated boron compound, such as boron trifluoride, chloromethylenedimethylammonium chloride or the like, and a mixture thereof at a temperature of 0°–200°C, preferably 50°–150°C. The reaction may be carried out in the absence of a solvent. However, it is possible and preferable to conduct the reaction in the presence of an inert solvent in order that the reaction be conducted smoothly in a homogeneous reaction system. Examples of such inert solvents include ether, halogenated hydrocarbons and petroleum solvents. One equivalent amount of an acidic compound or an acid anhydride is required for the cyclization reaction. Use of an excess of condensing agent, however, does not prevent the progress of the reaction.

Found particularly useful is phosphorus oxychloride, polyphosphoric acid ester or a fluorinated boron compound each of which gives the desired product in especially high yield. Preferred are phosphorus oxychloride and polyphosphoric acid ester, which not only can be used as the solvent in the cyclization reaction but also are miscible with most organic solvents. An excess of phosphorus oxychloride can be recovered easily by reduced pressure distillation.

The cyclization reaction produces both or either one of the N-substituted-6,7-methylenedioxy-4-quinolone-3-alkoxycarbonyl derivatives of the formula (I) in which $R_1$ is alkyl and N-substituted-6,7-methylenedioxy-4-quinolone-3-carboxylic acid derivatives of the formula (I) in which $R_1$ is hydrogen, depending upon the reaction conditions. The two reaction products can be easily separated from each other.

The product is usually an N-substituted-6,7-methylenedioxy-4-quinolone-3-alkoxycarbonyl derivative when an acid anhydride, a Lewis acid or phosphorus oxyhalide is used as a cyclizing agent. N-substituted-6,7-methylenedioxy-4-quinolone-3-carboxylic acid may be formed when the cyclization reaction is effected at above 100°C in the presence of an acid, e.g., polyphosphoric acid or sulfuric acid.

Should an N-substituted-3-alkoxycarbonyl-6,7-methylenedioxy-4-quinolone be obtained, it can be hydrolyzed to the corresponding free acid according to conventional methods.

If so-called halogenating agents, such as phosphorus oxhalide, phosphorus pentachloride, phosphorus trichloride or thionylchloride, are used as the cyclization agent, there may be formed an N-substituted-3-alkoxycarbonyl-4-halogeno-6,7-methylenedioxyquinolinium salt of the formula (III), wherein Y is halogen, as an intermediate.

The intermediate can be isolated as an iodide or perchlorate when one of hydrogen iodide, hydrogen perchlorate or their salts is added to an aqueous solution of the reaction product.

In this case the N-substituted-4-halogeno-6,7-methylenedioxy-3-alkoxycarbonylquinolinium salt is reacted with water or an alcohol of the formula, $R_2OH$, wherein $R_2$ is hydrogen or alkyl, to give the objective N-substituted-6,7-methylenedioxy-4-quinolone-3-carboxylic acid derivative of the formula (I) in a high yield. This reaction is carried out at a temperature of 0°–200°C, preferably 50°–120°C and it is preferred to use an acid or a base in order to accelerate the reaction. Examples of acids which may be used include inorganic acids such as, for example, hydrochloric acid, sulfuric acid and phosphoric acid and organic acidic compounds, such as, for example phenol, formic acid, acetic acid, propionic acid, alkyl- or arylsulfonic acid and alkylsulfonate. Examples of bases which may be used include inorganic bases such as, for example, alkali or alkaline earth metal hydroxides, carbonates or bicarbonates, alkali or alkaline earth metal salts of organic acids, organic bases such as, for example, pyridine, triethylamine and triethanol amine and quaternary ammonium salts of said organic amines. It is possible to conduct the reaction in the presence of a solvent and it is preferable to contact the quinolinium salt with water or an alcohol in the presence of the acid or base.

Alternatively, the N-substituted-6,7-methylenedioxy-4-halogeno-3-alkoxycarbonylquinolinium salts of the formula (III) are produced by reacting a 3,4-methylenedioxyanilinomethylenemalonate of the formula,

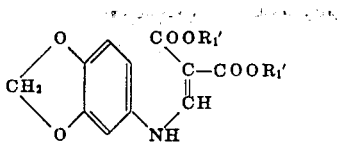

(VII)

wherein $R_1'$ is as defined above, or a 3-alkoxycarbonyl-4-hydroxy-6,7-methylenedioxyquinoline of the formula,

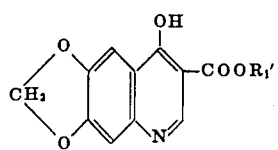

(VIII)

wherein $R_1'$ is as defined above, with a halogenating agent to yield a 3-alkoxycarbonyl-4-halogeno-6,7-methylenedioxyquinoline of the formula,

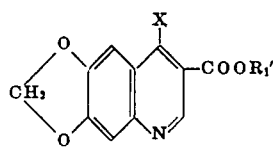

(VI)

wherein $R_1'$ is as defined above, and then reacting the obtained 3-alkoxy-carbonyl-4-halogeno-6,7-methylenedioxyquinoline with a suitable alkylating or alkenylating agent. The procedures for the preparation of these compounds are illustrated as follows.

Preparation of the 3-alkoxycarbonyl-4-halogeno-6,7-methylenedioxyquinolines of the formula (VI)

In the present invention, a 3,4-methylenedioxyanilinomethylenemalonate of the formula (VII) or a 3-alkoxycarbonyl-4-hydroxy-6,7-methylenedioxy-quinoline of the formula (VIII) is reacted with a halogenating agent.

Examples of such halogenating agents include phosphorus oxychloride, phosphorus oxybromide, phosphorus pentachloride, phosphorus trichloride, phosgene or thionylchloride, chloromethylenedimethylammonium chloride or a mixture thereof. The reaction of the 3,4-methylenedioxyanilinomethylene-malonate or the 3-alkoxycarbonyl-4-hydroxy-6,7-methylenedioxyquinoline with the halogenating agent is carried out at a temperature from room temperature to 200°C, preferably 50°–150°C. Though the reaction proceeds even when carried out in the absence of a solvent, it is preferable to use an inert solvent such as, for example, toluene, benzene, chlorobenzene, dichloroethane, chloroform, ether, petroleum hydrocarbon, etc., or to use excess of the halogenating agent as a solvent, in order to carry out the reaction smoothly. The presence of an amine, such as pyridine, diethylamine, etc., accelerates the reaction rate.

Preparation of N-substituted-3-alkoxycarbonyl-4-halogeno-6,7-methylene-dioxyquinolinium salts of the formula (III)

A 3-alkoxycarbonyl-4-halogeno-6,7-methylenedioxyquinoline is contacted with an equimolar or larger amount of an appropriate alkylating or alkenylating agent to yield the desired compound. Examples of such alkylating agents include alkyl sulfates, such as dimethyl sulfate, diethyl sulfate and ethyl p-toluenesulfonate, alkylcarbonates, such as dimethyl carbonate, and alkylhalides, such as methyliodide, ethyliodide, ethylbromide, butylbromide, isobutylbromide, propyliodide, hexyliodide, decylbromide, dodecylbromide and triethyloxonium fluoborate.

Examples of such alkenylating agents include alkenylhalides, such as vinyl chloride, allyl iodide and butenylbromide. This reaction is carried out at a temperature of 0°–200°C, preferably 25°–120°C. Through the reaction proceeds even in the absence of a solvent, it is preferable to carry out the reaction in the presence of an excess of the alkylating or alkenylating agent as a solvent or in the presence of an inert solvent such as, for example, ether, benzene, toluene, chloroform, petroleum hydrocarbon, etc.

The anionic ion of the thus obtained N-substituted-3-alkoxycarbonyl-4-halogeno-6,7-methylenedioxyquinolinium salt may be converted into various other kinds of anionic ions of inorganic or organic acids. This change of anionic ion is accomplished according to conventional procedure. That is, The N-substituted-3-alkoxycarbonyl-4-halogeno6,7-methylenedioxyquinolinium salt is treated with an ion exhanged resin and mixed with a desired inorganic or organic acid.

The present invention is illustrated in more detail with reference to the following examples. However it should be understood that the present invention is not limited to such examples. Various modifications within the scope of the present invention will occur to one skilled in the art.

EXAMPLE 1

Preparation of 1-ethyl-6,7-methylenedioxy-4-quinolone-3-carboxylic acid

Stage 1 a. 3,4-Methylenedioxyaniline (24.8 g) and Raney nickel (5 g) were added to ethanol (80 cc) and the obtained mixture was stirred and heated under reflux for 18 hours. After cooling, the catalyst was filtered off and the filtrate was concentrated. The resultant residual liquid was subjected to reduced pressure distillation to yield N-ethyl-3,4-methylenedioxy-aniline (29.2 g, yield: 97%) of colorless liquid, b.p. 92°–93°C/0.4 mmHg.

Elementary analysis

| | | | |
|---|---|---|---|
| Found: | C65.60% | H6.71% | N8.21% |
| Calculated for $C_9H_{11}NO_2$ | C65.44% | H6.71% | N8.48% | b. 3,4-Methylenedioxynitrobenzene (16.7 g) and Raney nickel (3 g) were suspended in ethanol (100 cc). Into the stirred suspension, hydrogen gas was introduced under atmospheric pressure until absorption of hydrogen gas ceased. Thereafter the reaction mixture was stirred and heated under reflux for 18 hours. After cooling, the catalyst was removed by filtration and the filtrate was concentrated and distilled under reduced pressure to give the colorless liquid, N-ethyl-3,4-methylene-dioxyaniline (15.9 g, 96%).

Stage 2

A mixture of N-ethyl-3,4-methylenedioxyaniline (5 g) obtained in Stage 1 and diethyl ethoxymethylenemalonate (6.5 g) was stirred and heated at 90°C for 1.5 hours and then for 30 minutes, while reducing the inner pressure by means of an aspirator, to give pure diethyl N-ethyl-3,4-methylenedioxy-anilinomethylenemalonate as an oily substance, which could be used in the next stage without purification.

A part of the product was purified by silica gel column chromatography using chloroform as an eluting solvent.

Elementary analysis

| | | | |
|---|---|---|---|
| Found | C 60.69% | H 6.08% | N 3.66% |
| Calculated for $C_{17}H_{21}NO_6$ | C 60.88% | H 6.31% | N 4.18% |

Stage 3 a. Diethyl N-ethyl-3,4-methylenedioxyanilinomethylenemalonate (10 g) was dissolved in phosphorus oxychloride (40 cc) and the resultant mixture was stirred and heated at 100°C for 2 hours, and then excess of phosphorus oxychloride was removed from the mixture by reduced pressure distillation. Ice-water was added to the obtained residue. The resultant mixture was basified by the addition of an aqueous sodium hydroxide solution, and heated at 95°–100°C for 3 hours. The mixture was then acidified by the addition of concentrated hydrochloric acid and cooled. The precipitate of 1-ethyl-6,7-methylenedioxy-4-quinolone-3-carboxylic acid (6.7 g) was collected by filtration and recystallized from aqueous dimethylformamide, colorless needles, m.p. 315°C (decomposition).

Elementary analysis

| | | | |
|---|---|---|---|
| Found | C 59.81% | H 4.10% | N 5.30% |
| Calculated for $C_{13}H_{11}NO_5$ | C 59.77% | H 4.24% | N 5.36% | b. Polyphosphoric acid ethyl ester was obtained by boiling a mixture of phosphorus pentoxide (15 g), anhydrous ether (15 cc) and chloroform (30 cc) under reflux for 20 hours until the mixture became transparent, filtering the mixture by means of glass-wool, and then removing the solvent from the filtrate under reduced pressure.

A mixture of the obtained polyphosphoric acid ethyl ester and diethyl N-ethyl-3,4-methylenedioxyanilinomethylenemalonate (3 g) obtained in Stage 2 was stirred and heated at 120°–130°C for 4 hours, while the ethanol produced was being removed by reducing the inner pressure by means of an aspirator. After the reaction was completed, the reaction mixture was poured into ice-water, basified by the addition of an aqueous sodium hydroxide solution. The resultant mixture was stirred with heating on a bath at 95–100°C for 1 hour. After cooling, the mixture was acidified to pH 3 by the addition of 3N-hydrochloric acid to precipitate 1-ethyl-6,7-methylenedioxy-4-quinolone-3-carboxylic acid, which was collected by filtration, washed with water and then dried. m.p. 315°C (decomposition). Yield: 2.51 g.

c. A mixture of N-ethyl-3,4-methylenedioxyanilinomethylenemalonate (3.45 g) obtained in Stage 2 and boron trifluoride etherate (20 cc) was refluxed for 3 hours. During the reaction, a white precipitate separated. After ice-cooling, the precipitate was collected by filtration, washed with ether, and then added to an aqueous 5% sodium hydroxide solution (50 cc) and the obtained mixture stirred with heating at 80°–90°C for 2.5 hours. After the reaction was completed, the reaction mixture was cooled and acidified to pH 2 by the addition of hydrochloric acid. The precipitate of 1-ethyl-6,7-methylene-dioxy-4-quinolone-3-carboxylic acid was collected by filtration, washed with water, dried and then recrystallized from aqueous dimethyl formamide to yield colorless needles (2.1 g), m.p. 315°C (decomposition).

d. Diethyl N-ethyl-3,4-methylenedioxyanilinomethylenemalonate (5.75 g) obtained in Stage 2 was dissolved in acetic anhydride (14 cc). Into the resultant mixture was added dropwise concentrated sulfuric acid (7 cc) while keeping the temperature below 80°C by cooling. After the addition, the mixture was allowed to stand for 15 minutes at room temperature and then poured into ice-water. The obtained mixture was basified by the addition of an aqueous sodium hydroxide solution and hydrolyzed by the procedure described in (a) above, to give 1-ethyl-6,7-methylenedioxy-4-quinolone-3-carboxylic acid, m.p. 315°C (decomposition).

e. Diethyl N-ethyl-3,4-methylenedioxyanilinomethylene-malonate (5 g) was added into polyphosphoric acid (25 g) and the obtained mixture was stirred and heated at 85°–90°C for 1 hour and thereafter mixed with ice-water (150 cc). The obtained mixture was heated at 95°–100°C for 2 hours. The resultant precipitate was collected by filtration, washed with water and dried to give 1-ethyl-6,7-methylenedioxy-4-quinolone-3-carboxylic acid, m.p. 314°C (decomposition.

EXAMPLE 2

Preparation of ethyl 1-ethyl-6,7-methylenedioxy-4-quinolone-3-carboxylate (a) Diethyl N-ethyl-3,4-methylenedioxyanilinomethylene-malonate (5 g) obtained by the procedure disclosed in Stage 1 and Stage 2 of Example 1 was added to polyphosphoric acid (50 g) with stirring below room temperature. The obtained yellow and viscous mixture was heated to 85°–90°C with stirring and the stirring was continued for 1.5 hours at the same temperature. After cooling, the mixture was mixed with ice-water (150 g) to give a homogeneous solution which was basified to pH 8–9 by the addition of an aqueous 50% sodium hydroxide solution. The precipitate produced was collected by filtration, washed with water and dried to give ethyl 1-ethyl-6,7-methylenedioxy-4-quinolone-3-carboxylate (3.5 g). Recrystallization from water gave colorless needles, m.p. 177°C–178°C.

Elementary analysis

| | | | |
|---|---|---|---|
| Found | C 62.82% | H 5.07% | N 5.03% |
| Calculated for $C_{15}H_{15}NO_2$ | C 62.28% | H 5.23% | N 4.8% | b. Diethyl N-ethyl-3,4-methylenedioxyanilinomethylene-malonate (4.6 g), obtained by the procedure disclosed in Stage and Stage 2 of Example 1 was dissolved in phosphorus oxychloride (20 g) and the resultant mixture was stirred and heated at 100°C for 2 hours.

Remaining phosphorus oxychloride was removed by distillation and the residue was poured into ice-water. The resultant mixture was basified to pH 9–10 by the addition of an aqueous sodium hydroxide solution under ice-cooling and then extracted with chloroform. The chloroform layer was washed with water, dried over anhydrous sodium sulfate and concentrated by distillation. The residue was treated with activated charcoal and recrystallized from water to yield colorless crystals of ethyl 1-ethyl-6,7-methylenedioxy-4-quinolone-3-carboxylate (8 g), m.p. 177°–178°C.

EXAMPLE 3

Preparation of 1-ethyl-6,7-methylenedioxy-4-quinolone-3-carboxylic acid
Stage 1

Diethyl N-ethyl-3,4-methylenedioxyanilinomethylene-malonate (40 g) was added into phosphorus oxychloride (160 cc), and the obtained mixture was stirred and heated at 75°C for 3 hours. After the reaction was over, excess of phosphorusoxychloride was distilled off under reduced pressure. The resultant residue, containing 1-ethyl-3-ethoxycarbonyl-4-chloro-6,7-methylenedioxyquinolinium chloride, was dissolved into ice-water and potassium iodide (50 g) was added to give a pale yellow precipitate of 1-ethyl-3-ethoxycarbonyl-4-chloro-6,7-methylenedioxyquinolinium iodide, which was collected by filtration, washed with water and dried, yield 47 g, m.p. 187°–188°C (decomposition).

Elementary analysis
Found                              C 41.26%   H 3.40%   N 3.41%
Calculated for $C_{15}H_{15}NO_4ClI$    C 41.36%   H 3.48%   N 3.21%

The 1-ethyl-3-ethoxycarbonyl-4-chloro-6,7-methylene-dioxyquinolinium chloride mentioned above was converted into a corresponding perchlorate by adding perchloric acid into a cold aqueous solution of the chloride and collecting the resultant precipitate by filtration, washing with water and drying. Recrystallization from acetone-ether gave yellow prismatic crystals which melted at 141°–142°C, and solidified by further heating and then melted again at 160°C.
Elementary analysis Found                              C 44.10%   H 3.70%   N 3.45%  Cl 17.38%
Calculated for
$C_{15}H_{15}NO_8Cl_2$             C 44.13%   H 3.71%   N 3.43%  Cl 17.38%

State 2 a. A mixture of 1-ethyl-3-ethoxycarbonyl-4-chloro-6,7-methylene-dioxyquinolinium iodide (1.8 g), obtained in Stage 1, sodium bicarbonate (2.5 g) and water (50 cc) was heated under reflux for 20 hours. After cooling, the mixture was acidified to pH 3 by addition of diluted hydrochloric acid to yield the precipitate of 1-ethyl-6,7-methylenedioxy-4-quinolone-3-carboxylic acid, which was collected by filtration. Yield 1.05 g, m.p. 315°C (decomposition).

Following the procedure of Stage 2 (a), except that the reaction was carried out under the following conditions, 1-ethyl-6,7-methylenedioxy-4-quinolone-3-carboxylic acid was obtained in the yields noted.

EXAMPLE 4

Preparation of 1-ethyl-6,7-methylenedioxy-4-quinolone-3-carboxylic acid
Stage 1 a. Diethyl 3,4-methylenedioxyanilinomethylenemalonate (30 g) was added into phosphorus oxychoride (240 cc) and the mixture was stirred and heated at 95°C for 3.5 hours. The phosphorus oxychloride was removed by distillation under reduced pressure and the obtained residue was poured into ice-water, and neutralized with an aqueous sodium carbonate solution. The yellow precipitate that separated was collected by filtration, washed with water and dried, yield 26.2 g. Recrystallization of the product from ethanol gave colorless prismatic or needle-like crystals of ethyl 4-chloro-6,7-methylenedioxy-3-quinoline carboxylate, m.p. 109°–109.5°C.

Elementary analysis
Found                              C 55.69%   H 3.33%   N 5.00%
Calculated for
$C_{13}H_{10}NO_4Cl$               C 55.86%   H 3.60%   N 5.01% b. Ethyl 4-hydroxy-6,7-methylenedioxy-3-quinoline-carboxylate (26 g) was added into phosphorus oxychloride (200 cc) and the obtained mixture was stirred and heated at 95°C for 3 hours. Worked up according to a procedure similar to that of above-mentioned procedure (a), ethyl 4-chloro-6,7-methylenedioxyquinoline-3-carboxylate (25 g) was obtained, m.p. 109°C.

Stage 2 a. Ethyl 4-chloro-6,7-methylenedioxy-3-quinolinecarboxylate (2.1 g) obtained in Stage 1 was added into ethyl iodide (20 cc) and the mixture was heated under reflux for 46 hours. The mixture was diluted with acetone and cooled. The precipitate was collected by filtration and washed with acetone to give pale yellow-colored 1-ethyl-3-ethoxycarbonyl-4-chloro-6,7-methylene-dioxyquinolinium iodide, m.p. 187°–188°C (decomposition).
Elementary analysis Found                              C 41.26%   H 3.40%   N 3.41%
Calculated for $C_{15}H_{15}NO_4ClI$    C 41.36%   H 3.48%   N 3.21%

The iodide thus obtained was converted to the corresponding perchlorate by adding an aqueous perchloric acid solution to a methanolic solution of the said iodide and collecting the resultant crystal. Recrystallization from acetone-ether gave the pure product which melted at 141°–142°C, solidified by further heating and then melted again at 160°C.
Elementary analysis Found                              C 44.10%   H 3.70%   N 3.45% Cl 17.38%
Calculated for
$C_{15}H_{15}NO_8Cl$               C 44.13%   H 3.71%   N 3.43% Cl 17.38% b. To a solution containing 4.95 g of ethyl 4-chloro-6,7-methylenedioxy-3-quinolinecarboxylate obtained in Stage 1, 20 cc of dichloroethane and 5 cc of chloroform was added 3.8 g of triethyloxonium fluoborate. The resultant mixture was heated with stirring at 50°C for 15 minutes and cooled in an ice bath. The crystalline solid which separated was collected by filtration

| 1-ethyl-3-ethoxycarbonyl-4-chloro-6,7-methylene-dioxyquinolinium iodide | Alkali | Water | Reaction time. temp. | 1-ethyl-6,7-methylene-dioxy-4-quinolone-3-carboxylic acid (g.) |
|---|---|---|---|---|
| b, grams... 1.8 | $Na_2CO_3$. 2.5 g. | 25 cc | 6 hrs | 1.0 |
| c, grams... 1.8 | 30 cc.. NaOH | Of 5% aqueous solution | 5 min | 1.1 |
| d, grams... 1.8 | | 20 cc | 4 hrs | 1.05 | and washed, with chloroform, yielding 5.4 g (77%) of 1-ethyl-3-ethoxy-carbonyl-4-chloro-6,7-methylenedioxyquinolinium fluoborate, m.p. 142°–146°C. Recrystallization from acetone-ether gave colorless prisms, m.p. 153°–155°C.
Elementary analysis

| | | | | |
|---|---|---|---|---|
| Found | C 45.39% | H 3.75% | N 3.66% | Cl 9.21% |
| Calculated for $C_{15}H_{15}O_4NBF_4Cl$ | C 45.57% | H 3.79% | N 3.54% | Cl 8.98% |

Stage 3 a. According to the procedure of Stage (2) of Example 3, 1-ethyl-6,7-methylenedioxy-4-quinolone-3-carboxylic acid was obtained from 1-ethyl-3-ethoxycarbonyl-4-chloro-6,7-methylenedioxy-quinolinium iodide.

b. A mixture containing 1 g of 1-ethyl-3-ethoxycarbonyl-4-chloro-6,7-methylenedioxy quinolinium fluoborate obtained in Stage 2-(b) and 20 cc of 5% aqueous sodium hydroxide solution was heated on a boiling water bath for 2 hours. The resultant solution was stirred with charcoal for decolorization, filtered and the filtrate acidified by the addition of 6 N hydrochloric acid. After cooling, precipitated 1-ethyl-6,7-methylenedioxy-4-quinolone-3-carboxylic acid was collected by filtration, washed with water and dried, weighing 0.57 g. Recrystallization from dimethylformamide gave colorless needles, m.p. 313°C (decomposition).

EXAMPLE 5

Preparation of ethyl 1-methyl-6,7-methylenedioxy-4-quinolone-3-carboxylate

Stage 1

A mixture of ethyl 4-chloro-6,7-methylenedioxyquinoline-3-carboxylate (5 g), dimethyl sulfate (7.3 g) and benzene (40 cc) was heated under reflux for 3 hours. 1-Methyl-3-ethoxycarbonyl-4-chloro-6,7-methylenedioxy-quinolinium methosulfate precipitated on cooling the mixture. The precipitate was collected by filtration, washed with benzene and then with acetone. m.p. 187°–188°C. (decomposition)
Elementary analysis

| | | | |
|---|---|---|---|
| Found | C 44.34% | H 3.67% | N 3.76% |
| Calculated for $C_{15}H_{15}NO_8ClS$ | C 44.39% | H 3.97% | N 3.45% |

Stage 2

1-Methyl-3-ethoxycarbonyl-4-chloro-6,7-methylenedioxy-quinolinium methosulfate (2 g) obtained in Stage 1 was dissolved in ethanol (20 cc). The solution obtained thus was boiled under reflux for 6 hours and then the ethanol was distilled off. The resultant residue was washed with a cold aqueous sodium bicarbonate solution and collected by filtration to give ethyl 1-methyl-6,7-methylenedioxy-4-quinolone-3-carboxylate (1.25 g), m.p. 202°–203°C.
Elementary analysis

| | | | |
|---|---|---|---|
| Found | C 61.23% | H 4.63% | N 5.05% |
| Calculated for $C_{14}H_{13}O_5N$ | C 61.09% | H 4.76% | N 5.09% |

EXAMPLE 6

Preparation of 1-methyl-6,7-methylenedioxy-4-quinolone-3-carboxylic acid

1-Methyl-3-ethoxycarbonyl-4-chloro-6,7-methylenedioxy-quinolinium methosulfate (2 g) obtained by a procedure similar to that in Stage 1 of Example 5 was added into 5%-hydrochloric acid (20 cc) and the obtained mixture was refluxed for 1 hour. After cooling, the precipitate of 1-methyl-6,7-methylenedioxy-4-quinolone-3-carboxylic acid was collected by filtration, m.p. 341°–343°C (decomposition).
Elementary analysis

| | | | |
|---|---|---|---|
| Found | C 58.52% | H 3.47% | N 6.00% |
| Calculated for $C_{12}H_9O_5N$ | C 58.30% | H 3.67% | N 5.67% |

EXAMPLE 7

Preparation of ethyl-6,7-methylenedioxy-4-quinolone-3-carboxylate

A mixture of 1-ethyl-3-ethoxycarbonyl-4-chloro-6,7-methylenedioxy-quinolinium iodide (1.8 g), sodium bicarbonate (2.5 g) and water (50 cc) was heated at 95°–100°C for 30 minutes. Ethyl 1-ethyl-6,7-methylenedioxy-4-quinolone-3-carboxylate precipitated on cooling the mixture. The precipitate was collected by filtration, washed with water and dried, m.p. 177°–178°C, yield 1.2 g.
Elementary analysis

| | | | |
|---|---|---|---|
| Found | C 62.38% | H 5.09% | N 4.95% |
| Calculated for $C_{15}H_{15}O_5N$ | C 62.28% | H 5.23% | N 4.84% |

EXAMPLE 8

Preparation of 1-ethyl-6,7-methylenedioxy-4-quinolone-3-carboxylic acid

A mixture of 1-ethyl-3-ethoxycarbonyl-4-chloro-6,7-methylenedioxy-quinolinium iodide (2.5 g), sodium bicarbonate (3 g) and water (60 cc) was heated at 90°–100°C for 4 hours and then cooled to give ethyl 1-ethyl-6,7-methylenedioxy-4-quinolone-3-carboxylate, which was collected by filtration, yield 1.1 g, m.p. 177°C The filtrate was acidified with hydrochloric acid to yield 1-ethyl-6,7-methylenedioxy-4-quinolone-3-carboxylic acid, yield 0.52 g, m.p. 315°C.

EXAMPLE 9

Preparation of 1-ethyl-6,7-methylenedioxy-4-quinolone-3-carboxylic acid

Diethyl N-ethyl-3,4-methylenedioxyanilinomethylene-malonate (20 g) was added into phosphorus oxychloride (100 g) and the resultant mixture was stirred and heated at 75°C for 3 hours. Excess of phosphorus oxychloride was distilled off and the residue containing 1-ethyl-3-ethoxycarbonyl-4-chloro-6,7-methylenedioxyquinolinium chloride was poured into water (500 cc), the resultant mixture was heated under reflux and then cooled. The precipitate of 1-ethyl-6,7-methylenedioxy-4-quinolone-3-carboxylic acid was collected by filtration, m.p. 315°C (decomposition). Yield 14.5 g.

EXAMPLE 10

Preparation of 1-ethyl-6,7-methylenedioxy-4-quinolone-3-carboxylic acid

Ethyl 1-ethyl-6,7-methylenedioxy-4-quinolone-3-carboxylate (3.6 g) was suspended in an aqueous 5% sodium hydroxide solution (50 cc) and the obtained supsension was heated on a boiling water bath for one hour. After cooling, the mixture was acidified to pH 1–2 by the addition of hydrochloric acid. The resultant precipitate of 1-ethyl-6,7-methylenedioxy-4-quinolone-3-carboxylic acid was collected by filtration, washed with water and dried. m.p. 314°C (decomposition). Yield: quantitative. Recrystallization from dimethyl formamide gave colorless needles of m.p. 317°C (decomposition).
Elementary analysis

| | | | |
|---|---|---|---|
| Found | C 59.81% | H 4.10% | N 5.30% |
| Calculated for $C_{13}H_{11}NO_5$ | C 59.77% | H 4.24% | N 5.36% |

EXAMPLE 11

According to the procedure of Stage 1 of Example 1, except that a mixture of 3,4-methylenedioxyaniline (25 g), Raney nickel (5 g) and methanol (80 cc) was boiled under reflux for 10 hours instead of the mixture of 3,4-methylenedioxyaniline (24.8 g), Raney nickel (5 g) and ethanol (80 cc) being boiled under reflux for 18 hours, there was obtained N-methyl-3,4-methylenedioxyaniline (yield 90%), b.p. 115°–118°/0.1 mmHg.

What is claimed is:

1. A process for producing 1-substituted-6,7-methylenedioxy-4-quinolone-3-carboxylic acid compounds of the formula (I):

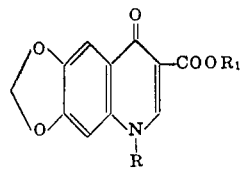

(I)

wherein R is alkyl having from 1 to 4 carbon atoms and $R_1$ is hydrogen or alkyl having from one to four carbon atoms, which process comprises the steps of reacting a dialkyl N-substituted-3,4-methylenedioxyanilinomethylenemalonate of the formula (V):

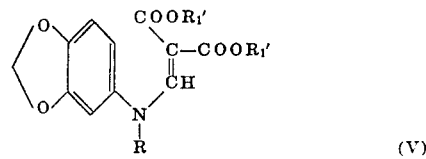

(V)

wherein R is as defined above and $R_1'$ is the same alkyl as defined in $R_1$, with $POCl_3$ at a temperature of 0–200°C. to yield a 1-substituted-3-alkoxy-carbonyl-4-chloro-6,7-methylenedioxyquinolinium salt of the formula (VI):

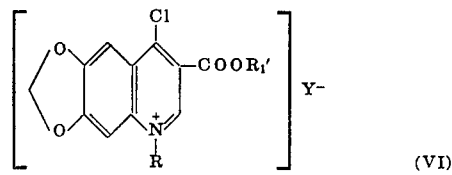

(VI)

wherein R and $R_1'$ are as defined above, and Y is halogen, and hydrolyzing said salt to yield the 1-substituted-6,7-methylenedioxy-4-quinolone-3-carboxylic acid compound of the above formula (I).

* * * * *